Figure 2:
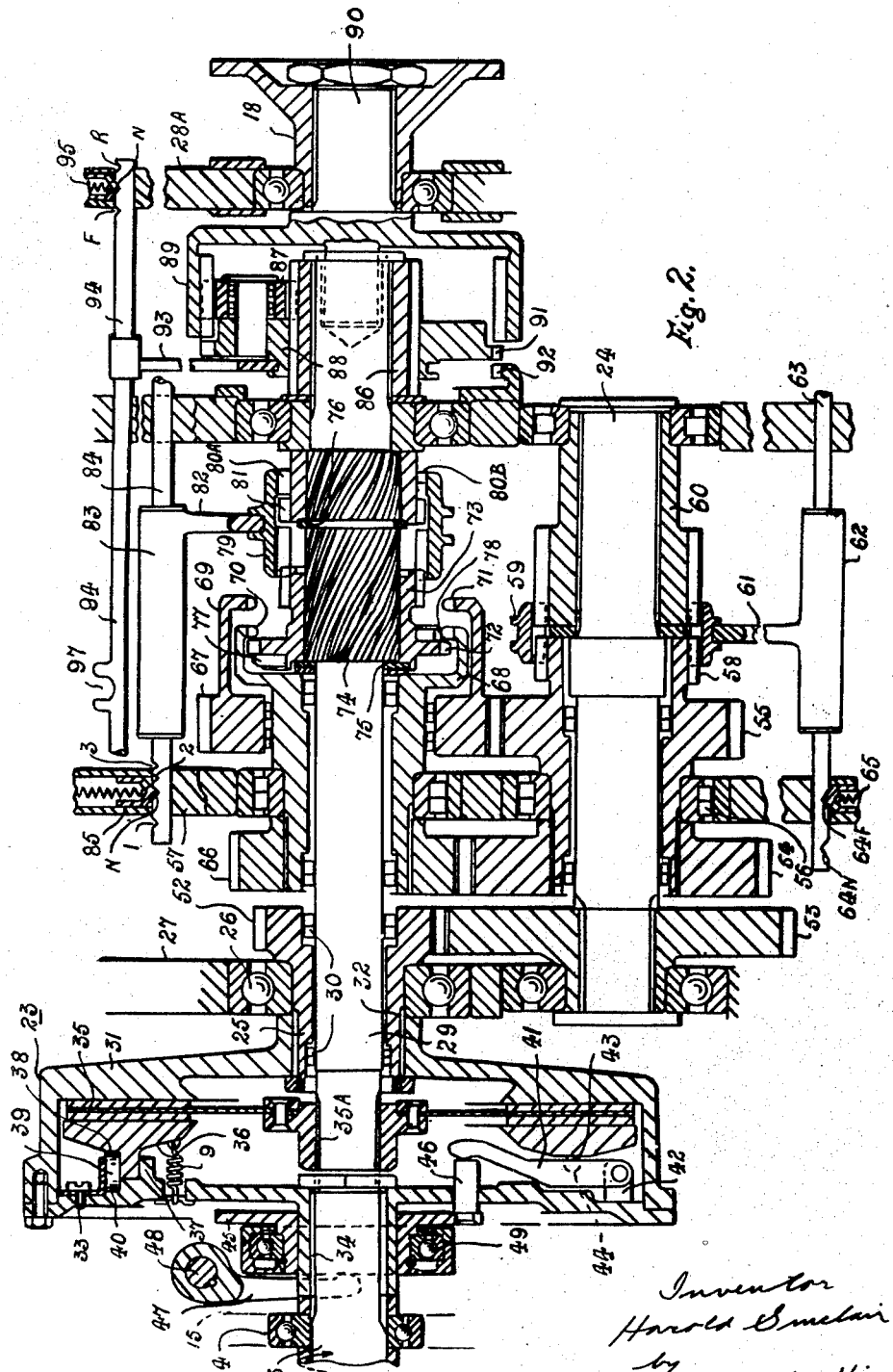

May 2, 1950          H. SINCLAIR          2,505,842
POWER TRANSMISSION SYSTEM
Filed May 8, 1947          2 Sheets-Sheet 1
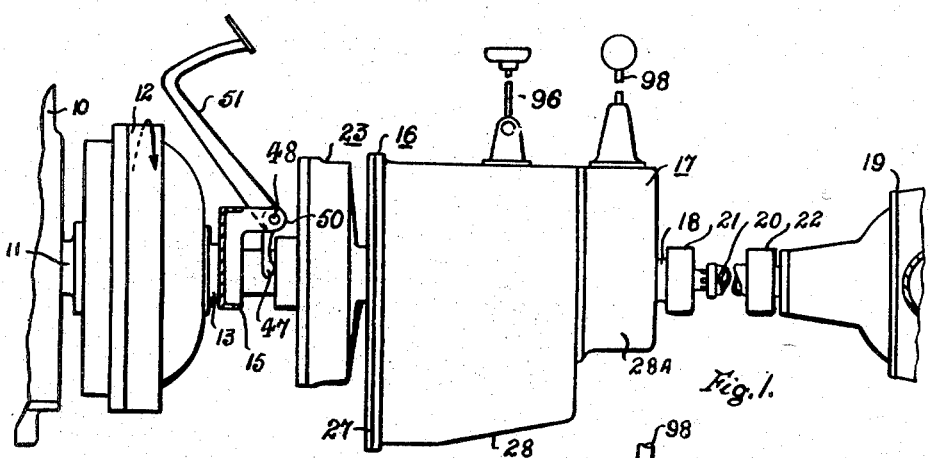
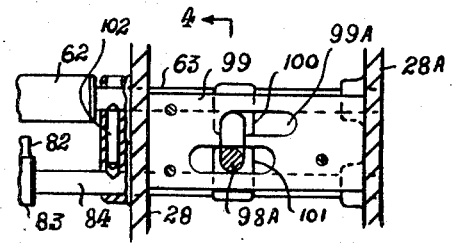
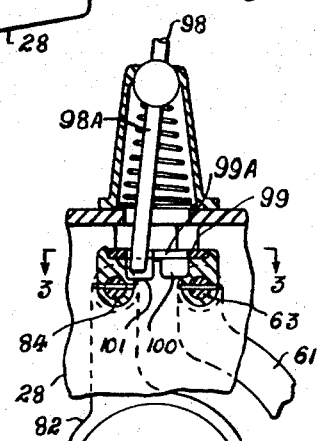
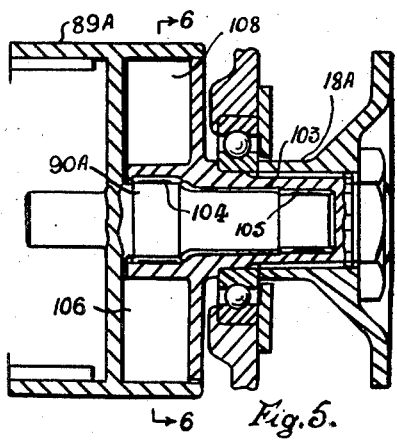
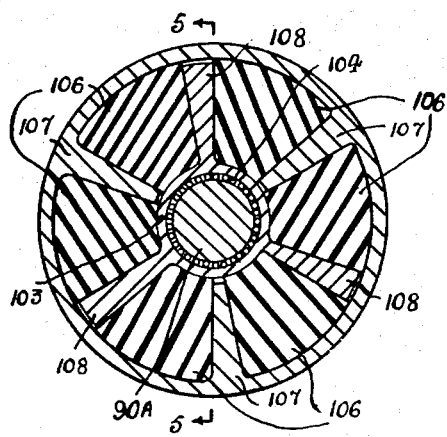
Inventor
Harold Sinclair Patented May 2, 1950

2,505,842

UNITED STATES PATENT OFFICE 2,505,842

POWER-TRANSMISSION SYSTEM

Harold Sinclair, London, England

Application May 8, 1947, Serial No. 746,823
In Great Britain March 22, 1946

Section 1, Public Law 690, August 8, 1946
Patent expires March 22, 1966

2 Claims. (Cl. 74—339)

The present invention relates to power-transmission systems of the kind embodying a hydraulic coupling or torque-converter of the kinetic type between a driving motor and multi-ratio gearing, the hydraulic transmitter being of the type, such as that working with a substantially constant liquid content, that does not completely interrupt the transmission of torque, and the gearing being characterised by two features, namely (1) that ratio-selecting clutch means for at least some of the forward-speed ratios are of the positive synchro-coupling type, as disclosed for example in U. S. Patents Nos. 1,862,188, 2,245,017, 2,202,217 and 2,320,757, which resist disengagement when subjected to torque loading and which cannot conveniently be employed to provide a neutral condition of the gearing, and (2) that the gearing is provided with a controllable and slipable coupling capable of transmitting a substantial torque between the input and output elements of the gearing for the purpose of maintaining torque transmission through the system during gear changes from a lower- to a high-speed ratio, as disclosed for example in U. S. Patent No. 2,011,734.

The term "of the positive synchro-coupling type" as applied herein to clutch means defines a mechanism having a first member, which may be for example the driving member or the driven member of the mechanism, a second member which may be the driven member or the driving member, and which is rotatable relatively to the first member, an intermediate member drivably connected to the second member by means constraining the intermediate member to slide relatively to the first and second members into and out of meshing engagement with the first member on reversal of torque through said means, and subsidiary means, such for example as an auxiliary drive between the first and intermediate members capable of overrunning under torque in one sense or of slipping, operative while these members are disengaged to mesh them together when the first and second members are urged to rotate relatively to eath other in one sense. The second member may be a shaft provided with helical splines, the intermediate member being a sleeve having corresponding internal helical splines co-operating with the shaft splines; when torque acts between the sleeve and the shaft, the splines co-operate to shift the sleeve along the shaft and thereby cause clutch teeth on the sleeve to engage with or disengage from clutch teeth on the first member. Alternatively the second member may be a helical-toothed gear wheel disposed with its axis parallel to that of the first member, the intermediate member, which is co-axial with the first member, including a helical-toothed gear wheel meshing with the first-mentioned gear wheel and provided with clutch teeth adapted to engage clutch teeth on the first member. The subsidiary means may be a driving connection of the ratchet type, including a pawl mounted on one of the first and intermediate members and adapted to co-operate with the clutch teeth on the other of these members when the sets of clutch teeth are disengaged, the pawl being operative to transmit torque in such a sense between the first and intermediate members that the second and intermediate members co-operate to cause the intermediate member to slide in the axial direction such that the sets of clutch teeth interengage cleanly under the registering action of the pawl.

When a power-transmission system of the kind specified is provided with a motor, such as an internal-combustion engine, which it is inconvenient to stop in order to change gear, e. g. from a high- to a low-speed ratio, when the output element of the system is held stationary, either by the load applied to it or by brakes, it is necessary to provide means for reducing or eliminating the torque load on the system so as to enable gear changes to be made under such circumstances when there is no relative rotation of the gears. Hitherto, two alternative arrangements for attaining this object have been employed. The first of these known arrangements is a disengageable main friction clutch connected in series with the change-speed gearing—usually between the hydraulic transmitter and the gearing. This arrangement is bulky and introduces difficulties in providing the necessary bearings for the several relatively rotatable elements of the system, and, in addition, the friction clutch requires control mechanism to be provided and actuated, and furthermore the whole of its functions, except the complete interruption of torque, can be better performed by the hydraulic transmitter. The other arrangement is a back-turning brake, comprising a controllable member capable of being frictionally engaged with a part of the system between the hydraulic transmitter and the gearing and thereafter turned backwards, whereby a sufficient degree of backward rotation can be imparted to the input element of the gearing to relieve the torque loading on it, as disclosed in U. S. Patent No. 1,978,172.

One object of this invention is to provide, in a power-transmission system of the kind hereinbefore specified, convenient means for obtaining neutral without the necessity for a main friction clutch or a back-turning brake.

Another object is to incorporate in such a system a reversing gear or a range-changing gear or a selective gear drive having two or more output members, and in which changes between different speed ratios, and between forward, neutral and reverse, or between different ranges or different output members, can be made, when there is no rotation of the gears, without the necessity for a main friction clutch or a back-turning brake.

Embodiments of the invention will be described by way of example and with reference to the accompanying diagrammatic drawings, in which—

Fig. 1 is an elevation of a transmission system for a road motor vehicle,

Fig. 2 is a sectional side elevation of the multi-ratio gearing and supplementary reversing gearing of the system shown in Fig. 1, gear-selectors being shown in detached sections for the sake of clearness, Fig. 3 is a sectional plan, taken on the line 3—3 in Fig. 4, showing the selectors of the multi-ratio gearing, Fig. 4 is a sectional end elevation, taken on the line 4—4 in Fig. 3, Fig. 5 is a sectional side elevation of an alternative design of a part of the reversing gearing of the system shown in Fig. 1, taken on the line 5—5 in Fig. 6, and Fig. 6 is a sectional end elevation taken on the line 6—6 in Fig. 5.

In a power-transmission system according to this invention, as exemplified by Figs. 1 and 2, the multi-ratio gearing firstly is so arranged that the controllable and slipable coupling is capable of connecting the input and output elements of this gearing in a ratio yielding a higher speed than and in the same sense as the ratio, or any of the ratios, established by the positive ratio-selecting couplings, and secondly is provided with at least one jaw clutch, sliding-mesh gear wheel, or like positive drive-disconnecting device operable for interrupting the transmission paths yielding the lower-speed ratios established by the positive ratio-selecting couplings.

In the system shown in Fig. 1, an internal-combustion motor 10 has its crankshaft 11 directly coupled to the driving part of a hydraulic turbo-coupling 12. The output shaft 13 of this coupling, which is supported by a bearing 14 (Fig. 2) carried in a fixed frame member 15, forms the input element of multi-ratio gearing 16 arranged to drive-reversing gearing 17. The output element 18 of the reversing gearing is coupled to a driving axle 19 of the vehicle by a propeller shaft 20 and universal joints 21 and 22.

The multi-ratio gearing, 16 which provides a direct high-speed drive through the auxiliary slipable coupling 23 and two low-speed indirect drives through a countershaft 24, has a hollow input shaft 25 carried by a bearing 26 which is housed in a front cover 27 of a gear case 28. The input shaft 25 surrounds an output shaft 29 which projects through the front end of the input shaft and is supported therein by bearings 30. The slipable coupling 23 is a friction clutch of the single-plate torque-amplified type having a driving body 31 connected by splines 32 to the front end of the input shaft 25. A cover 33 fixed to the body 31 is connected by splines 34 to the runner shaft 13 of the turbo coupling 12. The driven plate 35 of the slipable clutch 23 is connected by splines 35A to the front end of the output shaft 29. A pressure plate 36 associated with pull-off springs, such as 9, and slidable on a bearing 37 on the body cover 33 is provided with left-handed helical camming surfaces such as 38 co-operating with rollers such as 39 which in turn co-operate with left-handed helical camming surfaces such as 40 on the cover 33. The rollers and camming surfaces act in known manner to urge the pressure plate more firmly against the driven plate as soon as any driving torque load begins to be transmitted through the clutch. The direction of rotation of the motor 10 is indicated by the arrow in Fig. 1. The clutch-actuating means include radial levers such as 41 pivotally mounted on brackets such as 42 fixed to the cover 33 and bearing on the pressure plate 36 through the agency of balls such as 43, partly housed in pockets 44 in the levers so elongated as to allow for slight angular displacement of the pressure plate relative to the clutch body. A spider hub 45 is slidable on the hub of the cover 33 and is provided with pins such as 46 which co-operate with the levers 41. A yoke lever 47 fast on a transverse shaft 48 co-operates with a thrust bearing 49 on the spider hub 45. The shaft 48 is carried by fixed bearings such as 50 (Fig. 1) and is operable by a pedal 51 and if desired also by additional control means (not shown).

The input shaft 25 is connected by a train of two gear wheels 52 and 53 in constant mesh to the live countershaft 24 on which is rotatably mounted a cluster of two gear wheels 54 and 55. This cluster is supported by a bearing 56 in a wall 57 of the gear case 28. Jaw-clutch teeth 58 on the cluster are engageable by a jaw-clutch member 59 splined to a bush 60 rigid with the countershaft. The member 59 is actuated by a selector fork 61 coupled by a bidirectional pre-loaded link 62 to a selector rod 63 slidably carried in the gear case. The link 62 is of the kind shown in Fig. 5 of the specification of Patent No. 2,202,271. The rod 63 is provided with two notches 64F and 64N co-operating with a spring-loaded locating plunger 65 housed in the wall 57. The two cluster wheels 55 and 54 are in constant mesh respectively with a first-speed wheel 67 and a second-speed wheel 66 rotatable about the output shaft 29 and adapted to be selectively connected to the output shaft by a multiple position synchro-coupling comprising two internally toothed drums 68 and 69 rigidly connected to the wheels 66 and 67 respectively. The teeth 70 and 71 of these drums are alternatively engageable by teeth 72 on a nut 73 threaded on right-handed helical splines 74 of coarse pitch formed on the output shaft. The movement of the nut along the helical splines is limited by stops 75 and 76. In the rear extreme position the nut teeth 72 are in mesh with the first speed drum teeth 71, and the hand of the helical splines is such that driving torque through the first-speed transmission path retains the nut 73 against the stop 76 in this position. The nut can move along the splines 74 from the first-speed position successively through an intermediate position in which its teeth 72 are between the first- and second-speed teeth 71 and 70 and through a position in which its teeth are in mesh with the second-speed teeth 70, to the front extreme position in which the nut teeth are in front of the second-speed teeth. Travel of the nut into and out of mesh with the first- and second-speed teeth is assisted by two sets of pawls, such as 77 and 78, arranged in known manner respectively in front of and behind the nut teeth 72. A slidable locking sleeve 79 splined to the nut has internal teeth 80A and 80B engageable in various ways with locking teeth 81 rigid with the output shaft so as to provide rotational stops for the nut, whereby it can be locked in the first- and second-speed positions and permitted to run through to the front extreme position, which it occupies when direct drive is in use. The mode of operation of such a multiple position synchro-coupling will be clear from a study of Patent No. 2,202,271.

The locking sleeve is associated with a preselector shifting mechanism including a selector fork 82 coupled by a preloaded spring link 83, similar to the link 62, to a selector rod 84 slidably carried in the gear case and provided with notches 1, N, 2 and 3 co-operating with a spring-loaded locating plunger 85 housed in the wall 57.

The output shaft 29 of this three-speed gear constitutes the input shaft of a forward-and-reverse gear of a known planetary type housed in a case 28A fixed to the rear of the gear case 28. A sun pinion 86 fast on the shaft 29 meshes with planet pinions such as 87 rotatable on a planet-carrier 88, which is slidable and rotatable on the sun pinion. The planet pinions 87 are in mesh with a ring gear 89 integral with an output shaft 90 splined to the output element 18. Jaw-clutch teeth 91 on the planet-carrier 88 are engageable alternatively with a toothed sector 92 fixed to the gear case 28 and with the ring-gear teeth, to establish reverse and forward drives respectively. The planet-carrier 88 can be shifted by a selector fork 93 rigid with a selector rod 94. A spring loaded locating plunger 95 co-operates with notches F, N and R in the rod 94. A reversing control lever 96 (Fig. 1) cooperates with a notched lug 97 (Fig. 2) on the rod 94.

The countershaft jaw clutch and the locking sleeve of the synchro-coupling are controlled by a common lever 98 (Fig. 1) co-operating with a fixed gate 99 (Figs. 3 and 4). The tail part 98A of the lever 98 passes through a gate slot 99A and is alternatively engageable with two notched lugs 100 and 101 fast on the selector rods 63 and 84 respectively. The transverse part of the gate slot is so located that the lever part 98A can shift between the lugs 100 and 101 only when the rod 63 is in the position in which the plunger 65 is in the notch 64F and the rod 84 is in the position in which the plunger 85 is in the notch N. An interlocking plunger 102 co-operates with notches in the rods 63 and 84 to ensure that only one of them can be displaced at the same time from the positions in which they appear in Fig. 3.

In operation, when the output element 18 of the system is brought to rest and held stationary with the motor idling and one of the lower speed ratios engaged, the torque transmitted by the hydraulic transmitter 12 is sufficient to hinder or prevent disengagement of the positive synchro-coupling nut 73 and of the jaw-clutch element 59. However, if, under these circumstances, the slipable clutch 23 is fully engaged, and thereafter the output element of the three-speed gear system is caused to rotate forwards, even to a fractional extent, the torque loading will be eliminated from the transmission path of the engaged lower-speed gear, so that the jaw clutch 59 can be disengaged. Thereafter any desired gear change can be made in the system with the vehicle stationary and the jaw clutch 59 engaged with the aid of the slipable clutch acting as a stop for the runner element of the hydraulic transmitter.

Thus, for example, if the vehicle is brought to rest by the brakes on a forward indirect gear with the engine idling it can be reversed as follows. The control lever 98, which is engaged with the lug 101 of the selector rod 84, is shifted to the position shown in which it maintains or preselects first speed in the change-speed gear with the synchro-coupling unlocked i. e. the plunger 85 in the notch N; thereafter the lever 98 is shifted across the gate to engage the lug 100 of the selector rod 63 and thereafter operated to engage the notch 64N with the plunger 65, whereby the jaw clutch member 59 on the counter-shaft is urged to its disengaged position; the idling drag torque transmitted by the turbo coupling 13 prevents disengagement of the countershaft jaw clutch and, if the synchro-coupling nut is in the second gear position (corresponding to the notch 2 engaged with the plunger 85 and the link 83 in its normal condition), the drag torque acts to lock it in that position. To get into neutral gear, the slipable clutch 23 is temporarily fully engaged, e. g. by depression of the pedal 51, and the vehicle brakes are momentarily released so as to allow the drag torque acting through the clutch 23 to move the vehicle slightly, at least to the very small extent needed to permit the strain on the countershaft to be relieved and to relieve torque load on the synchro-coupling, permitting it to be unlocked by the spring link 83, and on the countershaft jaw clutch, permitting the latter to be disengaged by the spring link 62. The reversing gear is now free of load and is shifted to reverse by means of the lever 96 engaged in the lug 97 whereby the planet-carrier 88 is shifted to mesh its teeth 91 with the fixed tooth sector 92; the clutch 23 is temporarily engaged so as to arrest the rotation of the counter-shaft, and the countershaft jaw clutch is re-engaged by shifting the lever 98 to the crossway of the gate, whereupon on the release of the clutch 23 the drag torque causes the synchro-coupling to move into the first-speed position.

When the improved transmission system is employed on a vehicle, it is not always possible to impart the light rotational movement to the running wheels that is needed to effect a gear-changing operation with the vehicle stationary, for example on a locomotive hard against buffers, or a road motor vehicle stalled on a hill in too high a gear and being held by the brakes, and in order to meet such conditions, according to a further feature of the invention, there is provided, in the transmission parts between the output element of the change-speed gearing and the running wheels, a degree of torsional resilience sufficient to allow the rotation necessary to unload the engaged low-speed transmission path upon engagement of the auxiliary coupling and subsequent increase of the torque imposed by the motor on the system. If the final transmission of the vehicle is through a cardan shaft to a conventional geared axle the torque reaction in which is taken by the vehicle springs, this will provide sufficient torsional resilience for the purpose of this invention. If, however, a positive torque reaction anchorage is provided for the final drive and all the final drive shafts are very stiff in a torsional sense, it will be necessary to incorporate a torsionally resilient coupling.

If, for instance, when an indirect forward speed is engaged the vehicle having the transmission system shown in Fig. 1 is unable to move farther forwards, e. g. owing to the unusual circumstance of having been stopped with its front bumper hard against a wall and the brakes then applied, the engagement of reverse gear is effected as follows. Under these conditions, when the engine is idling, the torque load on the propeller shaft 20 is the idling drag torque transmitted by the turbo coupling 12 multiplied by the ratio of the engaged gear. The gear control member 98 is shifted to the position to unlock the synchro-coupling, and, while the engine is still idling, the slipable clutch 23 is fully engaged. The idling engine is now speeded up slightly so as to cause the torque transmitted by the turbo coupling directly through the slipable clutch 23 to exceed the torque previously on the propeller shaft and thereby rotate the front end of the propeller shaft, by "winding up" the torsionally resilient drive, to the small extent needed to relieve the load on the countershaft, so that the synchro-coupling is freed of load and the countershaft jaw clutch can be disengaged. The reversing gear is now free of load and can be shifted in the manner previously described.

If these is insufficient resilience in the parts of the transmission system behind the output shaft 29 of the multi-ratio gearing to permit such winding up, the example shown in Figs. 1 to 4 may be modified as shown in Figs. 5 and 6. The ring gear 89A of the planetary reversing gear is rigid with an intermediate shaft 90A and the output member 18A is rigid with a hollow shaft 103 in which the shaft 90A is supported by roller bearings 104 and 105. The shafts 90A and 103 are connected together by a torsionally resilient coupling constituted by rubber blocks 106 packed between radial webs 107 on the back of the ring gear and radial webs 108 on the shaft 103.

I claim:

1. A power-transmission system including a driving motor, multi-ratio gearing having an input element and an output element, a hydraulic power transmitter of the kinetic type connecting said driving motor to said input element, the hydraulic transmitter being of the type that does not completely interrupt the transmission of torque, and the gearing comprising as ratio-selecting means in at least one of the alternative forward-speed transmission paths between said input and output elements clutch means of the positive synchro-coupling type which resist disengagement when subjected to torque loading and which has no neutral position of the gearing, and said gearing also comprising a controllable and slipable coupling capable of transmitting a substantial torque and in parallel with the said one transmission path between said input and output elements, control means operable for engaging said slipable coupling for the purpose of maintaining torque transmission through the system during gear changes from a lower- to a high-speed ratio, said gearing being so arranged that said slipable coupling is capable of connecting said input and output elements in a ratio yielding a higher speed than and in the same sense as any ratio established by said positive synchro-coupling means, a positive drive-disconnecting device in series with said positive synchro-coupling means in the said one transmission path, and control means for actuating said drive-disconnecting device.

2. A power-transmission system as claimed in claim 1, and having a common control member for said synchro-coupling means and said drive-disconnecting device.

HAROLD SINCLAIR.

REFERENCES CITED

The following references are of record in the file of this patent:

UNITED STATES PATENTS

| Number | Name | Date |
|---|---|---|
| 2,011,734 | Sinclair | Aug. 20, 1935 |
| 2,016,835 | Nardone | Oct. 8, 1935 |
| 2,202,271 | Sinclair | May 28, 1940 |
| 2,320,757 | Sinclair | Jan. 1, 1943 |
| 2,328,291 | Osborne | Aug. 31, 1943 |
| 2,355,709 | Dodge | Aug. 15, 1944 |
| 2,394,405 | Schjolin | Feb. 5, 1946 |